United States Patent Office 3,071,556
Patented Jan. 1, 1963

3,071,556
POLYCARBONATE RESIN PLASTICIZED WITH THE REACTION PRODUCT OF ISATOIC ANHYDRIDE AND A DIHYDRIC ALCOHOL
Nicholas C. Bolgiano, Manor Township, Lancaster County, Pa., assignor to Armstrong Cork Company, Lancaster, Pa., a corporation of Pennsylvania
No Drawing. Filed June 14, 1960, Ser. No. 35,897
14 Claims. (Cl. 260—31.4)

This invention relates generally to polymeric materials, and more particularly to resinous polycarbonates. Still more particularly the invention relates to a plasticized composition comprising a polycarbonate resin.

The plasticization of polycarbonate resins has been difficult to achieve. This difficulty is due to the fact that the ordinary plasticizers such as the phosphite esters, phthalate esters, oils, fatty acids, and polymeric plasticizers are generally incompatible with polycarbonate resins. This has been true even with the common non-polar type plasticizers in use today.

It is the primary object of the present invention to supply a plasticizer for polycarbonate resins. It is a further object to supply a plasticized polycarbonate resinous composition, and the method of making the composition.

These objects are achieved in a straightforward and surprisingly effective manner. The invention contemplates a plasticized resinous composition comprising a polycarbonate plasticized with the reaction product of isatoic anhydride and an alkylene glycol.

The polycarbonates forming the resinous component of the composition of the present invention are most readily prepared by the reaction in a suitable solvent system of a bis-phenol and phosgene. Various bis-phenols may be used, and mixtures of bis-phenols may be used. In general, the structure of these polycarbonate resins may be said to be (1)
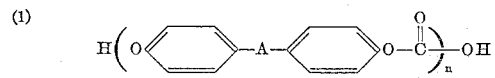

wherein A is a divalent radical which may be a hydrocarbon or an organic acid or an organic ester or any divalent group serving to link the two phenolic nuclei. In (1), $n$ will be a number sufficiently large to give a suitable molecular weight for the resin, usually in the range of about 10,000–500,000. It will be appreciated that if mixtures of bis-phenols have been used in the preparation of the polycarbonate resin, (1) will vary along the polymeric chain as the different molecules of the different bis-phenols occur in the chain. Some polycarbonates are prepared using varying amounts of tris-phenols, which trifunctional molecules serve as branching centers in the polymeric chain. Formula 1 does not exactly reflect this type of polycarbonate. The polycarbonates to be plasticized in accordance with the present invention will all possess the carbonate group (2)

and in addition will always have the (3)

radical attached to a carbonate group.

The primary starting material for the plasticizer of the present invention is isatoic anhydride of the formula (4)
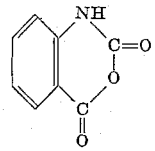

The isatoic anhydride is to be reacted with an alkylene glycol of the formula (5)                HO—R—OH wherein R is an alkylene group or an alkylene oxide group. These glycols contain no reactive groups in the molecule other than hydroxyl groups. Preferably the alkylene group will be ethylene or propylene. When mention is made herein of alkylene glycols it is intended to describe the straight alkylene glycols and the polyalkylene glycols such as diethylene glycol and higher polyethylene and propylene glycols.

Illustrative of the reaction which will produce the plasticizer of the present invention is (6)

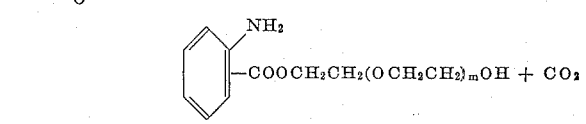

wherein $m$ may be any digit from zero up to a number large enough to give a molecular weight to the glycol of several thousand.

The reaction is carried out either by stirring the anhydride into the glycol or by taking up the two reactants in an inert solvent such as dioxane and conducting the reaction in the solvent. Alkaline catalysts such as small amounts of sodium hydroxide, potassium hydroxide, ammonium hydroxide, and the like enhance the speed of reaction. The resulting amino alcohol plasticizer for polycarbonates is soluble in water even when the high molecular weight polyalkylene glycols are used. For example, the plasticizer prepared from a polyethylene glycol having a molecular weight of about 2000 is water-soluble. One of the surprising features of these plasticizers is that they plasticize polycarbonates despite their strongly polar nature. Neither the isatoic anhydride nor the alkylene glycols are plasticizers for the polycarbonates when used alone or in a mixture. Besides being good polycarbonate plasticizers as such, these compounds contain other desirable properties required for good plasticizers. They possess low volatility, they are light in color, they have reasonable thermal stability, and they are easy to prepare.

Equation 6 shows a one-for-one mole ratio used of the two reactants. Two moles of the isatoic anhydride may also be used for each mole of the glycol. This will produce a compound having a (7)
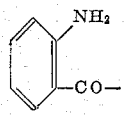

group at each end of the alkylene glycol molecule. The resulting diamino compound may in some instances be an even better plasticizer than the monoamino compound. If desired, the primary amine group or groups on the molecule may be acetylated, as with acetic anhydride, without adversely affecting the plasticizing properties of the compound.

The amount of these plasticizers to be incorporated into a polycarbonate resin will be determined by the properties of the plasticized polycarbonate desired. The plasticizing effect becomes detectable when about 2% by weight plasticizer based on the weight of the composition is used. Excellent compatibility of these plasticizers with many polycarbonates is achieved in up to at least 50 weight percent; this compatibility is readily apparent from the clarity of prepared films. Five to 20% by weight is the preferred range. The simplest manner of incorporating the plasticizers into the polycarbonate resin is to dissolve both the resin and the plasticizer in a mutual solvent such as the chlorinated hydrocarbons, for example methylene chloride, ethylene dichloride, dichloroethylene, or chlorobenzene, or other solvents such as dioxane or dimethyl formamide for dissolving the resin and plasticizer. The solvent can be removed by the application of heat or vacuum or both. Alternate methods are available. Plasticizer can be admixed with high-melting polycarbonates in an extruder or internal mixer. Milling will suffice for low-melting polycarbonates.

The following examples illustrate several embodiments of the invention. All parts are by weight unless otherwise stated.

*Example 1*

Into a reaction flask were placed 65.2 parts isatoic anhydride and 224 parts of a polyethylene glycol having a molecular weight of about 600. Dioxane was the solvent. A small amount of sodium hydroxide catalyst was added and the mixture was heated to form the corresponding monoamino alcohol described in Equation 6. The reaction product was filtered and then heated under vacuum to remove dioxane. The concentrate was diluted with an equal volume of benzene and washed with dilute hydrochloric acid saturated with sodium chloride. After drying the organic phase over magnesium sulfate, benzene was removed by application of heat and vacuum to yield the amino alcohol plasticizer. The product gave a hydroxyl number of 159.5.

A series of films of polycarbonate resins was prepared by dissolving in 100 parts of methylene chloride 10 parts of a polycarbonate having a molecular weight of 54,000 and being the reaction product of phosgene with 2,2-bis-(4 hydroxyl-phenyl)-propane. Films of the plasticized polycarbonate were prepared containing various amounts of the plasticizer. The resulting films were tested to determine the force necessary to stretch the films 10%. The Knoop Hardness was also determined for each film. Following are the results:

| Percent Plasticizer | 10% Modulus Kilograms Per Square Centimeter | Knoop Hardness |
|---|---|---|
| None (control) | 489 | 11.91 |
| 4.8 | 529 | 14.61 |
| 9.1 | 476 | 14.58 |
| 25.0 | 323 | 11.29 |

All films were clear and water white. All the films containing the plasticizer were noticeably more flexible than the control, increasing flexibility being noted with increasing plasticizer. The films containing 9.1 and 25% by weight of plasticizer had a noticeably less tinny sound when the film was snapped and rumpled.

*Example 2*

Example 1 was repeated with the same polyalkylene glycol, save that twice the amount of isatoic anhydride was used to make the plasticizer. Thus the resulting plasticizer was a diamino compound.

Films of polycarbonate resin containing varying amounts of plasticizer were prepared as in Example 1 with the following results:

| Percent Plasticizer | 10% Modulus Kilograms Per Square Centimeter | Knoop Hardness |
|---|---|---|
| None (control) | 489 | 11.91 |
| 4.8 | 460 | 12.67 |
| 9.1 | 451 | 15.36 |
| 25.0 | 346 | 14.84 |

All films were clear and water white, and increasing flexibility and less tinniness were noted with increasing plasticizer.

*Example 3*

Example 1 was repeated save that the polyalkylene glycol used was a polyethylene glycol having a molecular weight of about 2000. Following are the data from the resulting films:

| Percent Plasticizer | 10% Modulus Kilograms Per Square Centimeter | Knoop Hardness |
|---|---|---|
| None (control) | 489 | 11.91 |
| 4.8 | | 12.26 |
| 9.1 | | 13.87 |
| 25.0 | 329 | 11.07 |

Slight cloudiness was noticed with 25% of this plasticizer indicating the beginning of incompatibility.

*Example 4*

Example 3 was repeated except that sufficient isatoic anhydride was used to form the diamino compound. Following are the data from the polycarbonate films:

| Percent Plasticizer | 10% Modulus Kilograms Per Square Centimeter | Knoop Hardness |
|---|---|---|
| None (control) | 489 | 11.91 |
| 4.8 | 456 | 11.83 |
| 9.1 | 515 | 12.64 |
| 25.0 | 319 | 8.31 |

Again, slight cloudiness of the film containing 25% by weight of the diamino plasticizer showed slight cloudiness indicating partial incompatibility.

*Example 5*

A plasticizer was made according to Example 1 utilizing ethylene glycol. Varying amounts of the resulting monoamino compound were incorporated in a methylene chloride solution of a polycarbonate resin which was the reaction product of phosgene and 4,4-bis-(4 hydroxyl-phenyl)-pentanoic acid. Another series of polycarbonates was prepared utilizing the butyl ester of the pentanoic acid. Amounts of the plasticizer ranging from 2% by weight to 50% by weight are compatible and impart increasing flexibility to the polycarbonate films as amounts of the plasticizer are increased.

I claim:

1. A plasticized resinous composition comprising a polycarbonate possessing the carbonate group

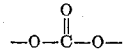

and having the

radical attached to the carbonate group plasticized with the reaction product of isatoic anhydride and an alkylene glycol having the formula

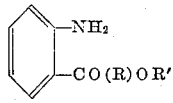

wherein R is selected from the group consisting of alkylene and polyalkylene oxide, and R' is selected from the group consisting of hydrogen and

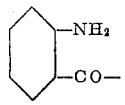

2. A plasticized composition according to claim 1 wherein said alkylene glycol comprises a polyalkylene glycol.

3. A composition according to claim 1 wherein said alkylene glycol comprises an ethylene glycol.

4. A composition according to claim 1 wherein said alkylene glycol comprises a propylene glycol.

5. A composition according to claim 1 wherein said reaction product comprises a monoamino compound.

6. A composition according to claim 1 wherein said reaction product comprises a diamino compound.

7. A composition according to claim 1 wherein said alkylene glycol has a molecular weight of about 600.

8. A composition according to claim 1 wherein said alkylene glycol has a molecular weight of about 2000.

9. A composition according to claim 1 wherein said reaction product is present in an amount of about 2–50% by weight of the resin-plasticizer mixture.

10. A composition according to claim 9 wherein said reaction product is present in an amount of about 5–20% by weight of the resin-plasticizer mixture.

11. The method of plasticizing a resinous polycarbonate possessing the carbonate group

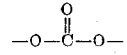

and having the

radical attached to the carbonate group comprising adding to said polycarbonate a plasticizing amount of the reaction product of isatoic anhydride and an alkylene glycol having the formula

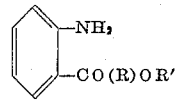

wherein R is selected from the group consisting of alkylene and polyalkylene oxide, and R' is selected from the group consisting of hydrogen and

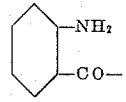

12. The method according to claim 11 wherein said reaction product comprises a monoamino compound.

13. The method according to claim 11 wherein said reaction product comprises a diamino compound.

14. The method according to claim 11 wherein said alkylene glycol comprises an ethylene glycol.

No references cited.